(12) United States Patent
Tyan et al.

(10) Patent No.: US 7,651,744 B2
(45) Date of Patent: Jan. 26, 2010

(54) LIQUID CRYSTAL DISPLAY

(75) Inventors: Horng-Long Tyan, Hsinchu (TW);
 Chyi-Ming Leu, Taichung County
 (TW); Tzong-Ming Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 295 days.

(21) Appl. No.: 11/283,872

(22) Filed: Nov. 22, 2005

(65) Prior Publication Data

US 2007/0087134 A1    Apr. 19, 2007

(30) Foreign Application Priority Data

Oct. 19, 2005    (TW) ............................... 94136537 A (51) Int. Cl.
  *G02F 1/13*      (2006.01)
  *G02F 1/136*     (2006.01)
(52) U.S. Cl. ........................ 428/1.6; 349/158
(58) Field of Classification Search ................. 428/1.3, 428/1.6, 1.31; 349/158, 106
See application file for complete search history.

(56) References Cited

U.S. PATENT DOCUMENTS

| | | | | |
|---|---|---|---|---|
| 3,287,311 | A * | 11/1966 | Edwards | 524/600 |
| 4,751,146 | A | 6/1988 | Maeda et al. | |
| 5,053,480 | A * | 10/1991 | Koto et al. | 528/188 |
| 5,364,908 | A * | 11/1994 | Oishi et al. | 525/64 |
| 5,610,742 | A | 3/1997 | Hinata et al. | |
| 5,856,065 | A * | 1/1999 | Hagen | 430/283.1 |
| 5,856,432 | A * | 1/1999 | Auman et al. | 528/353 |
| 6,010,825 | A * | 1/2000 | Hagen et al. | 430/283.1 |
| 6,525,791 | B1 * | 2/2003 | Tsuda et al. | 349/106 |
| 6,734,276 | B2 * | 5/2004 | Yamashita et al. | 528/170 |
| 6,962,756 | B2 * | 11/2005 | Kihara et al. | 428/690 |
| 7,026,032 | B2 * | 4/2006 | Lee et al. | 428/98 |
| 7,144,679 | B2 * | 12/2006 | Izumida et al. | 430/283.1 |
| 7,160,587 | B2 | 1/2007 | Doi et al. | |
| 2002/0022710 | A1 * | 2/2002 | McGrath et al. | 528/170 |
| 2002/0192445 | A1 * | 12/2002 | Ezzell et al. | 428/212 |
| 2003/0078333 | A1 | 4/2003 | Kawaguchi et al. | |
| 2003/0104232 | A1 | 6/2003 | Kihara et al. | |
| 2003/0134460 | A1 * | 7/2003 | Forbes et al. | 438/158 |
| 2003/0194573 | A1 * | 10/2003 | Itoh et al. | 428/461 |
| 2004/0018131 | A1 * | 1/2004 | Izumida et al. | 423/22 |
| 2005/0145832 | A1 * | 7/2005 | Wessling et al. | 252/500 |

OTHER PUBLICATIONS

JPO Website Machine English Translation of JP 2003-231752, Nishio et al., Aug. 19, 2003.*

* cited by examiner

*Primary Examiner*—David R Sample
*Assistant Examiner*—Sophie Hon
(74) *Attorney, Agent, or Firm*—Birch, Stewart, Kolasch & Birch, LLP (57) ABSTRACT

A liquid crystal display. The liquid crystal display includes a color filter substrate and an array substrate, wherein at least one of the color filter substrate and the array substrate comprises polyimide having formula (I):

$$\left(\text{A}-\text{N}\underset{\underset{\text{O}}{\|}}{\overset{\overset{\text{O}}{\|}}{\underset{\text{O}}{\overset{\text{O}}{\|}}}}\text{B}\underset{\underset{\text{O}}{\|}}{\overset{\overset{\text{O}}{\|}}{\text{N}}}\right)_x\left(\text{A}'-\text{N}\underset{\underset{\text{O}}{\|}}{\overset{\overset{\text{O}}{\|}}{\text{B}'}}\underset{\underset{\text{O}}{\|}}{\overset{\overset{\text{O}}{\|}}{\text{N}}}\right)_y \quad (I)$$

wherein A and A' are the same or different and comprise cycloaliphatic compounds or aromatic compounds, B and B' are the same or different and comprise aromatic compounds, and x and y are 10~10000, wherein at least one of A and A' is a cycloaliphatic compound.

20 Claims, 1 Drawing Sheet

FIG. 1

LIQUID CRYSTAL DISPLAY

BACKGROUND

The invention relates to a liquid crystal display, and more specifically to a polyimide liquid crystal display.

With advances in information and digitization, light, thin, and portable electronic products utilizing thin display panels have become popular. However, it is inconvenient for porterage and its complicated fabrication may cause low yields.

Thus, a transparent and flexible plastic substrate (0.1~0.2 mm) has been developed. Such plastic substrate is thin, light, durable, and portable, and produced by a continuous rolling process, significantly reducing costs Unfortunately, problems such as deposition of indium tin oxide (ITO) and thin film transistor (TFT) thereon and back-end panel assembly occur. Additionally, the glass transition temperature (Tg) of the optical-level plastic substrate such as PET, PEN, PC, or m-COC (Arton or Zeonor) is lower than 200° C., being unfavorable to fabrication. Also, PES substrate has insufficient solvent resistance, with yellowing and cracking at high temperatures (200° C.). Furthermore, some polyimide plastic substrates capable of thermal and solvent resistance, being dark brown, are only suitable for use in reflective LCD panels, not transmission LCD panels.

Additionally, the plastic substrate must be fixed to a glass substrate by resin glue to facilitate subsequent multi-lithography and etching due to its difficulty in handling. However, TFT element breakage and residual resin glue may easily occur when the plastic substrate is taken off the glass substrate.

SUMMARY

The invention provides a liquid crystal display comprising a color filter substrate and an array substrate, wherein at least one of the color filter substrate and the array substrate comprises polyimide having formula (I):

wherein A and A' are the same or different and comprise cycloaliphatic compounds or aromatic compounds, B and B' are the same or different and comprise aromatic compounds, and x and y are 10~10000, wherein at least one of A and A' is a cycloaliphatic compound.

A detailed description is given in the following embodiments with reference to the accompanying drawing.

BRIEF DESCRIPTION OF THE DRAWINGS

The invention can be more fully understood by reading the subsequent detailed description and examples with references made to the accompanying drawing, wherein.

DETAILED DESCRIPTION

The invention provides a liquid crystal display comprising a color filter substrate and an array substrate. At least one of the color filter substrate and the array substrate comprises polyimide having formula (I):

In formula (I), A and A' may be the same or different and comprise cycloaliphatic compounds such as wherein X, Y, and Z may comprise hydrogen, methyl, trifluoromethyl, hydroxyl, $C_{1-18}$ alkyl, bromine, chlorine, or iodine, or aromatic compounds such as wherein X and Y may comprise hydrogen, methyl, trifluoromethyl, hydroxyl, $C_{1-18}$ alkyl, bromine, chlorine, or iodine and Z may comprise —O—, —CH$_2$—, —S—, —SO$_2$—, —C(CH$_3$)$_2$—, —Ar—O—Ar—, —Ar—CH$_2$—Ar—, —O—Ar—C(CH$_3$)$_2$—Ar—O—, —O—Ar—Ar—O—, —O—Ar—C(CF$_3$)$_2$—Ar—O—, or —Ar—C(CH$_3$)$_2$—Ar—, wherein Ar is phenyl.

B and B' may be the same or different and comprise aromatic compounds such as wherein X and Y may comprise hydrogen, methyl, trifluoromethyl, hydroxyl, $C_{1-18}$ alkoxy, bromine, chlorine, or iodine and Z may comprise —O—, —SO$_2$—, —CH$_2$—, —C(CH$_3$)$_2$—, —COO(CH$_3$)$_2$COO—, —C(CF$_3$)$_2$—, —Ar—O—Ar—, —O—Ar—O—, —Ar—CH$_2$—Ar—, —O—Ar—C(CH$_3$)$_2$—Ar—O—, —O—Ar—Ar—O—, —O—Ar—C(CF$_3$)$_2$—Ar—O—, or —Ar—C(CH$_3$)$_2$—Ar—, wherein Ar is phenyl. B and B' may be and x and y may be 10~10000.

The polyimide having formula (I) provided by the invention comprises

-continued wherein x and y may be 10~10000.

The polyimide provided by the invention may have formula (II):

(II)

In formula (II), A may be a cycloaliphatic compound such as

,  ,

, or  , wherein X, Y, and Z may comprise hydrogen, methyl, trifluoromethyl, hydroxyl, C1-18 alkyl, bromine, chlorine, or iodine.

B may be an aromatic compound such as wherein X and Y may comprise hydrogen, methyl, trifluoromethyl, hydroxyl, $C_{1-18}$ alkoxy, bromine, chlorine, or iodine and Z may comprise —O—, —SO$_2$—, —CH$_2$—, —C(CH$_3$)$_2$—, —COO(CH$_3$)$_2$COO—, —C(CF$_3$)$_2$—, —Ar—O—Ar—, —O—Ar—O—, —Ar—CH$_2$—Ar—, —O—Ar—C(CH$_3$)$_2$—Ar—O—, —O—Ar—Ar—O—, —O—Ar—C(CF$_3$)$_2$—Ar—O—, or —Ar—C(CH$_3$)$_2$—Ar—, wherein Ar is phenyl. B and B' may be , or

, and n may be 10~10000.

The polyimide having formula (II) provided by the invention comprises

The compound of formula (II) is prepared in two steps as follows. First, a diamine such as 4,4-methylene bis(cyclohexylamine) (DACH), a dianhydride monomer such as 2,2'-bis(3,4-dicarboxyphenyl)hexafluoropropane dianhydride (6FDA), and a polar solvent such as N-methyl-2-pyrrolidone (NMP) or N,N-dimethylacetamide (DMAc) are added to a flask and reacted to form a poly(amic acid) (PAA). The PAA is then imidized at about 300~400° C. to form a polyimide via dehydration and cyclization. The reaction scheme is shown below.

Second, a diamine such as 4,4-methylene bis(cyclohexylamine) (DACH), a dianhydride monomer such as 2,2'-bis(3,4-dicarboxyphenyl)hexafluoropropane dianhydride (6FDA), and a solvent such as m-cresol or phenol are added to a flask and reacted at a reflux temperature to form a polyimide via PAA formation, dehydration, and cyclization. The reaction scheme is shown below.

Compared to the traditional polyimide, the novel polyimide, a partial phenyl structure, comprising a cycloaliphatic diamine monomer and an aromatic dianhydride monomer, provides higher thermal resistance and transmission rate and improved workability and chemical resistance due to conduction of the cycloaliphatic compounds thereto.

The polyimide film has haze less than 3%, a transmission rate exceeding 70%, a yellow index less than 6.5, a glass transition temperature of about 250~350° C., a coefficient of thermal expansion of about 20~75 ppm/° C., and a thickness of about 20~200 μm, preferably 50~150 μm.

Figure 1:
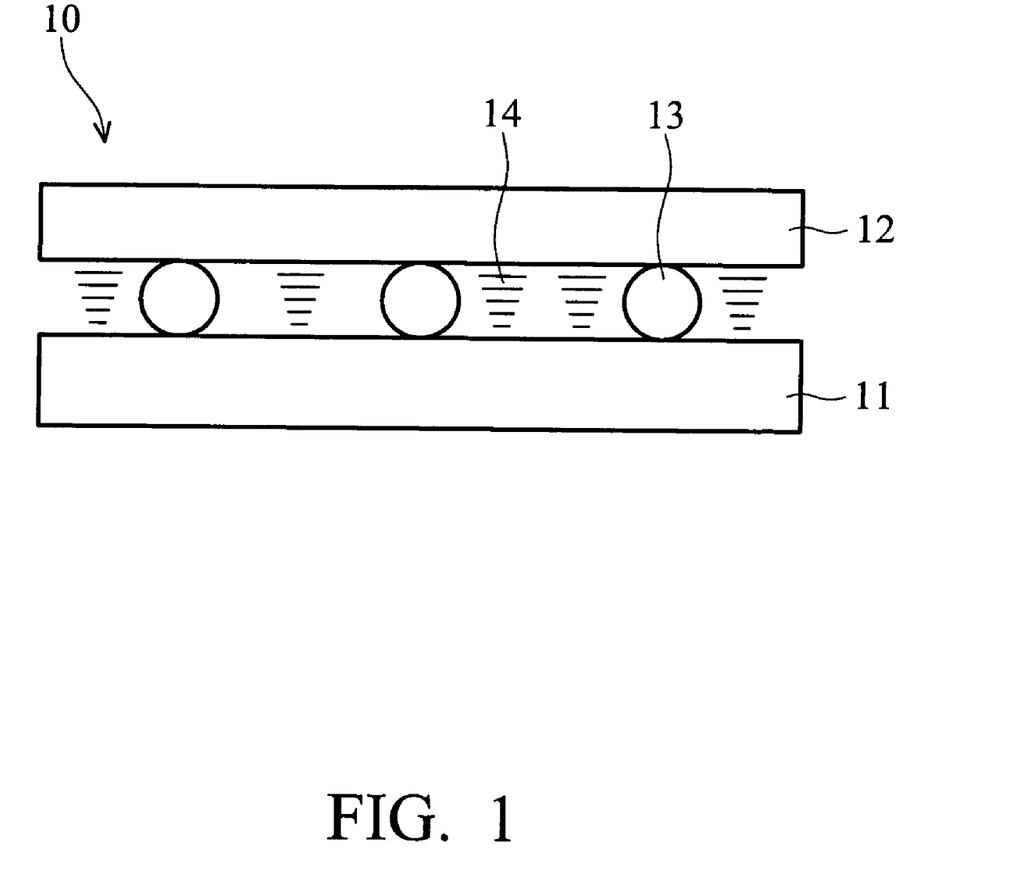
FIG. 1 is a cross section of a liquid crystal display of the invention.

In FIG. 1, a liquid crystal display structure of the invention is illustrated. A liquid crystal display 10 comprises an array substrate 11, a color filter substrate 12, spacers 13, and liquid crystals 14. At least one of the array substrate 11 and color filter substrate 12 is composed of polyimide. The array substrate 11 is opposite to the color filter substrate 12 and the spacers 13 and liquid crystals 14 are formed therebetween.

EXAMPLES

Example 1

Preparation of 6FDA-DACH (PI-FD))

2.329 DACH was dissolved in 41 g DMAc at room temperature under nitrogen gas. Next, 5 g 6FDA was added to form a sticky PAA solution with stirring for 3 hr. The PAA solution was then filmed on a glass substrate by a doctor blade and imidized at 100° C., 200° C., and 300° C., respectively, for 1 hr to form a transparent and colorless polyimide film.

Example 2

Preparation of 6FDA-m-TB-HG-co-6FDA-IPDA (PI-FTI))

1.64 g m-TB-HG and 0.56 g IPDA were dissolved in 41 g DMAc at room temperature under nitrogen gas. Next, 5 g 6FDA was added to form a sticky PAA solution with stirring for 3 hr. The PAA solution was then filmed on a glass substrate by a doctor blade and imidized at 100° C., 200° C., and 300° C., respectively, for 1 hr to form a transparent and colorless polyimide film.

Example 3

Preparation of 6FDA-m-TB-HG-co-6FDA-DACH (PI-FTD))

1.63 g M-TB-HG and 0.70 g DACH were dissolved in 42 g DMAc at room temperature under nitrogen gas. Next, 5 g 6FDA was added to form a sticky PAA solution with stirring for 3 hr. The PAA solution was then filmed on a glass substrate by a doctor blade and imidized at 100° C., 200° C., and 300° C., respectively, for 1 hr to form a transparent and colorless polyimide film.

Example 4

Preparation of 6FDA-m-DACH-co-DSDA-DACH (PI-FDD))

3.12 g DACH was dissolved in 46 g DMAc at room temperature under nitrogen gas. Next, 3 g 6FDA and 3 g DSDA were added to form a sticky PAA solution with stirring for 3 hr. The PAA solution was then filmed on a glass substrate by a doctor blade and imidized at 100° C., 200° C., and 300° C., respectively, for 1 hr to form a transparent and colorless polyimide film.

Example 5

Preparation of ODPA-BAPPm-co-ODPA-IPDA (PI-OBI))

4.53 g BAPPm and 0.81 g IPDA were dissolved in 59 g DMAc at room temperature under nitrogen gas. Next, 5 g ODPA was added to form a sticky PAA solution with stirring for 3 hr. The PAA solution was then filmed on a glass substrate by a doctor blade and imidized at 100° C., 200° C., and 300° C., respectively, for 1 hr to form a transparent and colorless polyimide film.

Thickness, haze, transmission rate, yellow index, glass transition temperature, and coefficient of thermal expansion of the disclosed polyimide film (such as PI-FD, PI-FTI, PI-FTD, PI-FDD, and PI-OBI) and conventional material (such as PES, Kapton, and Ube) are compared in Table 1.

TABLE 1

| Polyimide | Thickness (μm) | Haze (%) | Transmission rate (%) | Yellow index | Glass transition temperature (° C.) | Coefficient of thermal expansion (ppm/° C.) |
|---|---|---|---|---|---|---|
| PI-FD | 59 | 0.24 | 90.3 | 6.33 | 326 | 68 |
| PI-FTI | 69 | 1.96 | 89.4 | 3.59 | 336 | 71 |
| PI-FTD | 79 | 1.74 | 90.0 | 3.98 | 307 | 75 |
| PI-FDD | 60 | 1.74 | 90.7 | 2.78 | 301 | 61 |
| PI-OBI | 52 | 2.91 | 89.0 | 6.37 | 285 | 73 |

TABLE 1-continued

| Polyimide | Thickness (μm) | Haze (%) | Transmission rate (%) | Yellow index | Glass transition temperature (° C.) | Coefficient of thermal expansion (ppm/° C.) |
|---|---|---|---|---|---|---|
| Conventional material | | | | | | |
| PES | 200 | 0.30 | 89.0 | 0.97 | 225 | 58 |
| Kapton | 25 | 0.72 | 73.6 | 82.34 | 318 | 16 |
| Ube | 51 | 2.49 | 32.1 | 66.46 | 332 | 23 |

Compared to the disclosed polyimide, the conventional PES is not a proper substrate material because of its lower glass transition temperature even has a better haze, transmission rate, and yellow index. Kapton and Ube are also unsuitable for use as substrate due to raised yellow index and deteriorated transmission rate.

Additionally, the disclosed polyimide can be directly filmed on a glass substrate without use of resin glue and easily removed after multi-lithography and etching or treating with a water bath, simplifying the TFT processes. The polyimide can be widely used in flexible LCDs, PDPS, FEDs, SEDs, E-inks, and E-papers, or OLEDs.

What is claimed is:

1. A liquid crystal display, comprising: a color filter substrate; and an array substrate; wherein at least one of the color filter substrate and the array substrate consists of polyimide having formula (I):

(I)

wherein A and A' are the same or different and comprise (1) cycloaliphatic compounds comprising at least one of wherein X, Y, Z comprise hydrogen, methyl, trifluoromethyl, hydroxyl, $C_{1-18}$ alkyl, bromine, chlorine or iodine or (2) aromatic compounds; B and B' are the same or different and comprise aromatic compounds, and x and y are 10~10,000, wherein at least one of A and A' is a cycloaliphatic compound from the (1) cycloaliphatic compounds comprising at least one of 2. The liquid crystal display as claimed in claim 1, wherein one of A and A' comprise wherein X and Y comprise hydrogen, methyl, trifluoromethyl, hydroxyl, $C_{1-18}$ alkyl, bromine, chlorine, or iodine and Z comprises —O—, —CH$_2$—, —S—, —SO$_2$—, —C(CH$_3$)$_2$—, —Ar—O—Ar—, —Ar—CH$_2$—Ar—, —O—Ar—C(CH$_3$)$_2$—Ar—O—, —O—Ar—Ar—O—, —O—Ar—C(CF$_3$)$_2$—Ar—O—, or —Ar—C(CH$_3$)$_2$—Ar—, wherein Ar is phenyl.

3. The liquid crystal display as claimed in claim 1, wherein B and B' comprise wherein X and Y comprise hydrogen, methyl, trifluoromethyl, hydroxyl, $C_{1-18}$ alkoxy, bromine, chlorine, or iodine and Z comprises —O—, —SO$_2$—, —CH$_2$—, —C(CH$_3$)$_2$—, —COO(CH$_3$)$_2$COO—, —C(CF$_3$)$_2$—, —Ar—O—Ar—, —O—Ar—O—, —Ar—CH$_2$—Ar—, —O—Ar—C(CH$_3$)$_2$—Ar—O—, —O—Ar—Ar—O—, —O—Ar—C(CF$_3$)$_2$—Ar—O—, or —Ar—C(CH$_3$)$_2$—Ar—, wherein Ar is phenyl.

4. The liquid crystal display as claimed in claim 1, wherein B and B' comprise

5. The liquid crystal display as claimed in claim 1, wherein the polyimide comprises wherein x and y are 10~10000.

6. The liquid crystal display as claimed in claim 1, wherein the polyimide comprises wherein x and y are 10~10000.

7. The liquid crystal display as claimed in claim 1, wherein the polyimide comprises wherein x and y are 10~10000.

8. The liquid crystal display as claimed in claim 1, wherein the polyimide comprises wherein x and y are 10~1000.

9. The liquid crystal display as claimed in claim 1, wherein the polyimide comprises formula (II):

wherein A is a cycloaliphatic compound comprising wherein X, Y, and Z comprise hydrogen, methyl, trifluoromethyl, hydroxyl, $C_{1-18}$ alkyl, bromine, chlorine, or iodine, B is an aromatic compound comprising wherein X and Y comprise hydrogen, methyl, trifluoromethyl, hydroxyl, $C_{1-18}$ alkoxy, bromine, chlorine, or iodine and Z comprises —O—, —SO$_2$—, —CH$_2$—, —C(CH$_3$)$_2$—, —COO(CH$_3$)$_2$COO—, —C(CF$_3$)$_2$—, —Ar—O—Ar—, —O—Ar—O—, —Ar—CH$_2$—Ar—, —O—Ar—C(CH$_3$)$_2$—Ar—O—, —O—Ar—Ar—O—, —O—Ar—C(CF$_3$)$_2$—Ar—O—, or —Ar—C(CH$_3$)$_2$—Ar—, wherein Ar is phenyl, and n is 10~10000.

10. The liquid crystal display as claimed in claim 9, wherein B comprises , or

.

11. The liquid crystal display as claimed in claim 9, wherein the polyimide comprises 12. The liquid crystal display as claimed in claim 1, further comprising spacers formed between the color filter substrate and the array substrate.

13. The liquid crystal display as claimed in claim 1, further comprising liquid crystals interposed between the color filter substrate and the array substrate.

14. The liquid crystal display as claimed in claim 1, wherein the substrate comprising polyimide has haze less than 3%.

15. The liquid crystal display as claimed in claim 1, wherein the substrate comprising polyimide has a transmission rate exceeding 70%.

16. The liquid crystal display as claimed in claim 1, wherein the substrate comprising polyimide has a yellow index less than 6.5%.

17. The liquid crystal display as claimed in claim 1, wherein the substrate comprising polyimide has a glass transition temperature (Tg) of about 250~350° C.

18. The liquid crystal display as claimed in claim 1, wherein the substrate comprising polyimide has a coefficient of thermal expansion (CTE) of about 20~75 ppm/° C.

19. The liquid crystal display as claimed in claim 1, wherein the substrate comprising polyimide has a thickness of about 20~200 μm.

20. The liquid crystal display as claimed in claim 1, wherein the substrate comprising polyimide has a thickness of about 50~150 μm.

* * * * *